Nov. 25, 1969  C. G. SIMONS  3,480,252

PIPELINE MILKING SYSTEM

Filed Jan. 30, 1967

Inventor
Clifford G. Simons
By Andrus & Starke
Attorneys

United States Patent Office 3,480,252
Patented Nov. 25, 1969

3,480,252
PIPELINE MILKING SYSTEM
Clifford G. Simons, Delavan, Wis., assignor to Sta-Rite Industries, Inc., Delavan, Wis., a corporation of Wisconsin
Filed Jan. 30, 1967, Ser. No. 612,697
Int. Cl. F16k 51/00, 1/20
U.S. Cl. 251—146                                    8 Claims

ABSTRACT OF THE DISCLOSURE

The invention relates to a device for connecting a milking apparatus to a vacuum pipeline. The device includes a valve body mounted on the pipeline and having an opening in alignment with an opening in the pipeline. The opening in the valve body is enclosed by a hinged lid and the milking apparatus includes a rigid tubular nipple adapted to be inserted within the opening in the valve body and containing an annular sealing member disposed to engage the valve seat to provide an airtight seal when the nipple is engaged with the valve body.

---

In a pipeline milking system, a rigid pipeline runs the length of the barn and is connected to a vacuum pump. At positions throughout the length of the pipeline, valves or connectors are provided to which the individual milkers can be attached. As each cow is milked out, the milker is removed from the valve and reinstalled with a second valve at a location adjacent the next cow to be milked.

In the past, when installing a pipeline milking system, the barn is measured and the positions of the various valves are layed out. The pipeline is then prefabricated with outlet nipples or valves welded to the pipe at the desired locations. This results in a relatively inflexible system in which the valves are fixed in position so that it is not normally possible to change the location of the various valves without an extensive modification of the pipeline system. In addition, prefabricating the pipeline is relatively costly due to the fact that individual nipples have to be welded to the pipeline at the desired locations.

The present invention is directed to an improved valve construction for a pipeline milking system which can be readily installed with existing pipe by merely drilling a hole in the pipe at the desired location and attaching the valve assembly. More specifically, the valve assembly of the invention includes a valve body which is clamped to the pipeline and has an opening aligned with an opening in the pipeline. The opening in the valve body is closed off by a hinged lid, and the underside of the lid is provided with a sealing disc which engages the valve seat to provide an airtight seal when the lid is in the down or closed position. The milking apparatus includes a rigid, tubular nipple which is attached to the milker hose, and the nipple is adapted to be inserted within the opening in the valve body. Spaced from the end of the nipple is an annular flange, and a sealing member bears against the flange and is adapted to engage the valve seat when the nipple is inserted into the valve body. The flange and seal on the nipple will not only provide an airtight seal, but also properly position the nipple within the valve body.

The valve assembly of the invention can be installed with existing pipes by merely drilling a hole in the pipe and clamping the valve body around the pipeline. This enables the unit to be installed by the dairyman and eliminates the relatively costly prefabrication and welding which is ordinarily required with a conventional system. Due to the ease with which the valve assembly can be installed, the dairyman can readily change the locations of the valve assemblies on the pipeline with the result that a more flexible system is provided.

The valve assembly of the invention can also be cleaned in place without disassembly. This is a decided advantage, for when dealing with a milking system it is necessary after each milking to completely wash or sanitize all parts of the pipeline which were contacted by milk. As the unit of the invention can be cleaned without disassembly or changing of position, the washing operation is greatly simplified.

As a further advantage, the lid on the valve body is self-closing and will automatically return to the closed position when the nipple is removed from the valve body, thereby minimizing the amount of air which is permitted to enter the vacuum line.

The unit also provides an excellent seal between the nipple and the valve body, thereby preventing the loss of vacuum in the vacuum pipeline.

The valve unit of the invention has only a few parts which are subjected to wear in service. If the seal on the nipple is worn, it can be readily replaced without disassembling the valve assembly. Similarly, if the sealing disc in the lid is worn, it also can be replaced without disassembling the valve from the pipeline.

Other objects and advantages will appear in the course of the following description.

The drawings illustrate the best mode presently contemplated of carrying out the invention.

Figure 1:
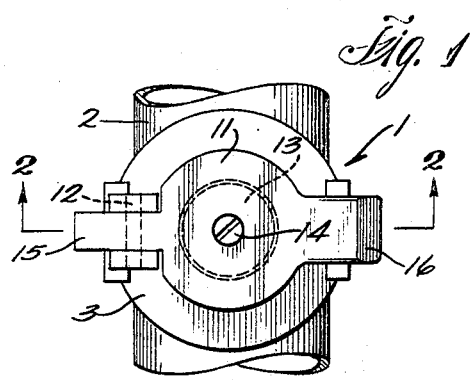
FIG. 1 is a plan view of the valve assembly as attached to a pipeline milking system.
Figure 2:
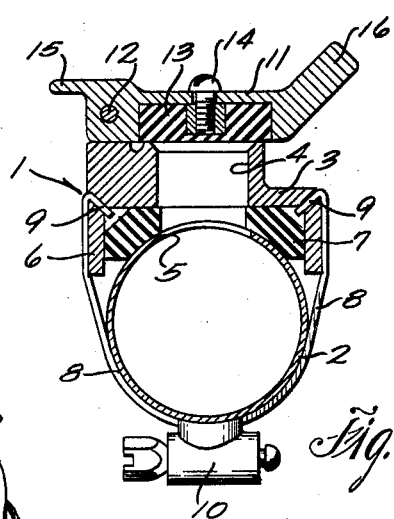
FIG. 2 is a sectional view taken along line 2—2 of FIG. 1 with the lid in the closed position.
Figure 3:
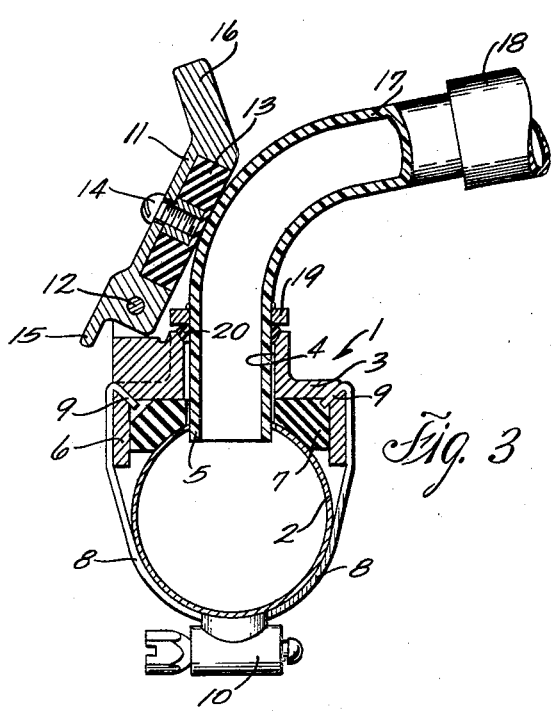
FIG. 3 is a view similar to FIG. 2 showing the lid in the open position and the nipple inserted within the valve body.

The drawings illustrate a valve assembly 1 attached to a pipeline of a pipeline milking system. The valve assembly 1 includes a valve body 3 having a central opening 4 which is positioned in alignment with an opening 5 in the pipeline 2.

To seal the valve body 3 to the pipeline 2, the body is provided with a downwardly extending flange 6 which encloses an annular seal 7 that bears against the outer surface of the pipeline surrounding the opening 5. The valve body is clamped to the pipeline by a pair of clamping straps 8. The upper bent ends 9 of the straps are received within slots in the valve body and the free ends are connected together by a conventional clamping nut 10.

The upper end of the opening 4 in the valve body 3 is closed off by a lid 11 which is hinged to the valve body by a pin 12. To seal off the opening 4 when the lid is in the closed position, the undersurface of the lid 11 is provided with a recess which receives a sealing disc 13. Sealing disc 13 is retained within the recess by a stud 14. Pivotal movement of the lid 11 is restricted by a stop 15 which extends outwardly from the lid adjacent the hinge pin 12. The stop 15 is positioned so that it will strike the valve body 3 before the lid 11 reaches a vertical position. This results in the lid being self-closing for the lid will fall by gravity to the closed position.

Lid 11 is also provided with an inclined extension or projection 16 which extends upwardly at an angle from the opposite side of the lid from the stop 15. Extension 16 is adapted to be engaged by the nipple 17 attached to milker hose 18 to enable the lid to be pivoted upwardly.

Nipple 17 is generally L-shaped and has one end connected to hose 18 attached to a conventional milker, while the opposite or lower end of nipple 17 is adapted to be inserted within central opening 4 in valve body 3 and communicates with the interior of the vacuum pipeline 2.

To properly position the nipple 17 within the opening 4, an annular flange 19 is spaced from the lower end of the nipple and an O-ring seal 20 is located beneath the flange 19. When the nipple 17 is inserted within the opening 4, the O-ring 20 is wedged downwardly against the tapered valve seat 21 to provide a fluid-tight seal between the members. Flange 19 provides a positive stop by engaging the upper end of the body 3 to properly position the nipple within the opening 4.

To install the valve unit of the invention, the hole 5 is initially drilled into the pipeline 2 at the desired location. The valve body 3 is then positioned on the pipeline with the opening 4 in alignment with the opening 5 and the ends of the straps 8 are then connected by the nut 10 to draw the body tightly against the pipeline.

The lid is self-closing and will normally fall by gravity to the closed position. When it is desired to install a milker with the valve unit 1, the nipple 17 is brought into contact with the extension 16 and moved upwardly, thereby pivoting the lid to the raised position. The end of the nipple can then be inserted within the opening 4 until the flange 19 engages the upper end of the valve body 3. In this position the O-ring seal 20 is wedged against the valve seat 21 to provide a fluid-tight connection.

After the cow has been milked out and it is desired to move the milker to a new location, the nipple 17 is merely withdrawn from the opening 4 and the lid, because of its weighted arrangement, will fall to the closed position. This results in a minimum amount of air being allowed to enter the vacuum system.

The valve unit of the invention can be cleaned in place during the washing cycle without disassembly. This aids in reducing the overall time required for the washing operation, for the dairyman is not required to disassemble or adjust the position of the valve assemblies.

Moreover, there are few parts which are subjected to wear in service. The only parts which normally would be worn are the sealing disc 13 and the O-ring seal 20. Both of these elements can be readily removed and replaced without disassambling the valve unit from the pipeline.

The valve construction of the invention provides an efficient seal when in the closed position and also provides a fluid-tight seal to the milker line when the milker is installed with the valve body.

The unit can be installed by merely drilling an opening in the desired location of the pipeline and it is not necessary to weld or otherwise secure auxiliary connectors or nipples to the pipeline in order to install the valve unit of the invention.

I claim:

1. In a milking system, a generally horizontal pipeline connected to a source of sub-atmospheric pressure and having an opening therein, said opening disposed above a horizontal plane extending through the axis of the pipeline, a valve body mounted on the pipeline and having a passage disposed in alignment with the opening in the pipeline, a portion of the valve body bordering said passage defining a valve seat, means for removably securing the valve body in a non-rotatable relation to the pipeline, a pivotal lid connected to the valve body and engageable with the valve seat for opening and closing said passage in the valve body, sealing means connected to the underside of the lid and disposed to engage said valve seat when the lid is in the closed position and seal said passage, a relatively rigid tubular member connected to a milking apparatus and having an end to be disposed within said passage when said lid is in an open position, and an annular seal disposed around said tubular member and spaced from said end, said seal disposed against valve seat to provide a fluid tight connection between said tubular member and said valve body.

2. The structure of claim 1, and including a projection formed on said tubular member adjacent said annular seal, said seal being located in a direction toward said end from said projection and said projection functioning to limit the insertion of said tubular member within said passage.

3. The structure of claim 2, in which said tubular member is a generally L-shaped tube and said projection constitutes an annular flange on said tube.

4. The structure of claim 3, in which the seal bears against said annular flange.

5. The structure of claim 1, in which said system includes stop means for limiting the pivotal movement of said lid with respect to said body.

6. The structure of claim 5, in which said stop means is disposed on said lid and is arranged to engage the valve body as said lid is pivoted to an open position.

7. The structure of claim 6, and including an extension located opposite said stop means on said lid and extending laterally beyond said lid, said extension dispose to be engage by the end of said tubular member to raise the lid and expose said passage for insertion of said tubular member.

8. The system of claim 1, wherein said valve seat is provided with an inclined surface and said tubular member is provided with a projection adjacent said annular seal, said seal being located in a direction toward said end from said projection and said seal being compressed between said projection and said inclined surface when said tubular member is inserted within said passage.

References Cited

UNITED STATES PATENTS

| | | | |
|---|---|---|---|
| 1,709,751 | 4/1929 | Shipley | 285—197 |
| 2,277,229 | 3/1942 | Hulbert | 251—149.2 |
| 2,783,771 | 3/1957 | Thomas | 251—146 |
| 2,949,276 | 8/1960 | Merritt et al. | 251—146 |
| 3,011,755 | 12/1961 | Babson | 251—146 |
| 3,055,385 | 9/1962 | Tieken | 137—381 |
| 3,272,471 | 9/1966 | McCullah | 251—146 |

M. CARY NELSON, Primary Examiner

WILLIAM R. CLINE, Assistant Examiner

U.S. Cl. X.R.

137—381; 251—299